W. A. HARRIS.
TIRE ALARM AND GAUGE.
APPLICATION FILED JUNE 9, 1921.
1,411,917.
Patented Apr. 4, 1922.
2 SHEETS—SHEET 1.
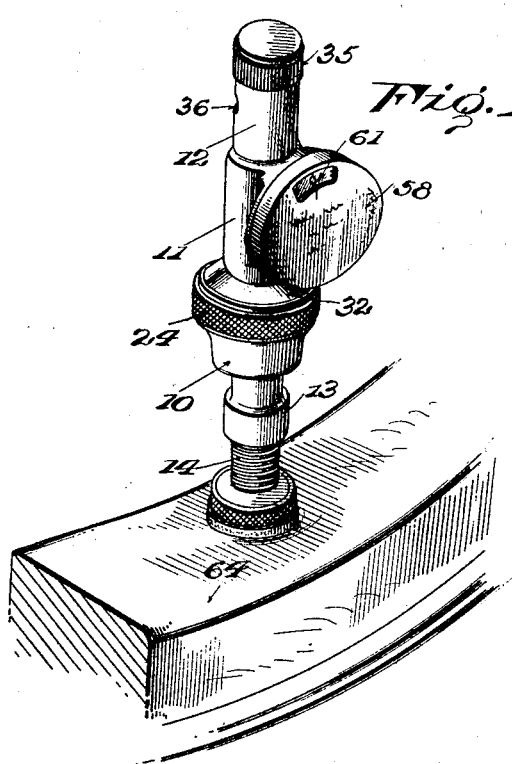
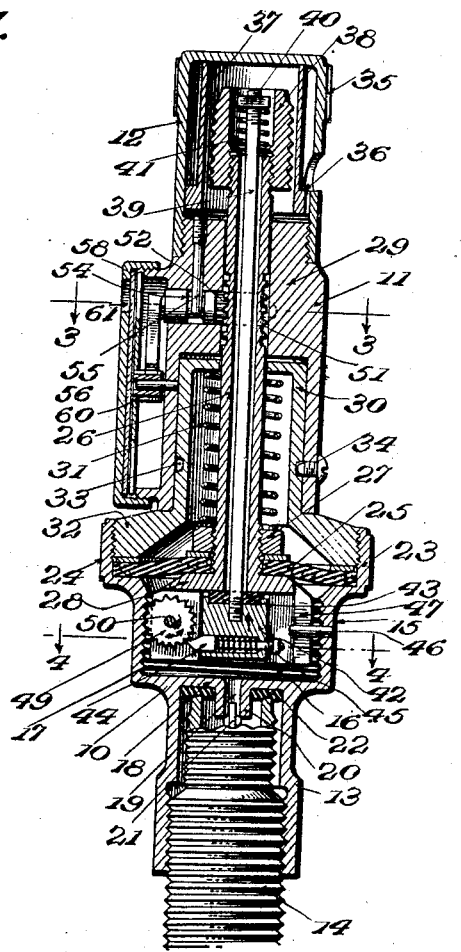
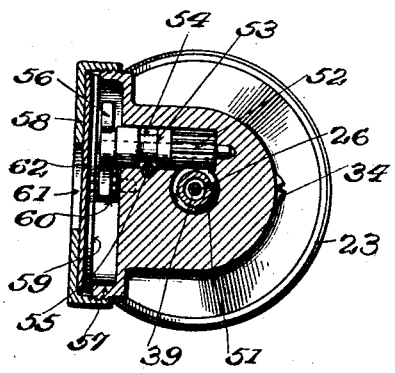
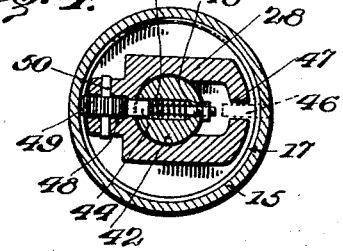
WITNESSES
W. A. Williams
INVENTOR
W. A. Harris.
BY
Munn & Co.
ATTORNEYS W. A. HARRIS.
TIRE ALARM AND GAUGE.
APPLICATION FILED JUNE 9, 1921.
1,411,917.
Patented Apr. 4, 1922.
2 SHEETS—SHEET 2.
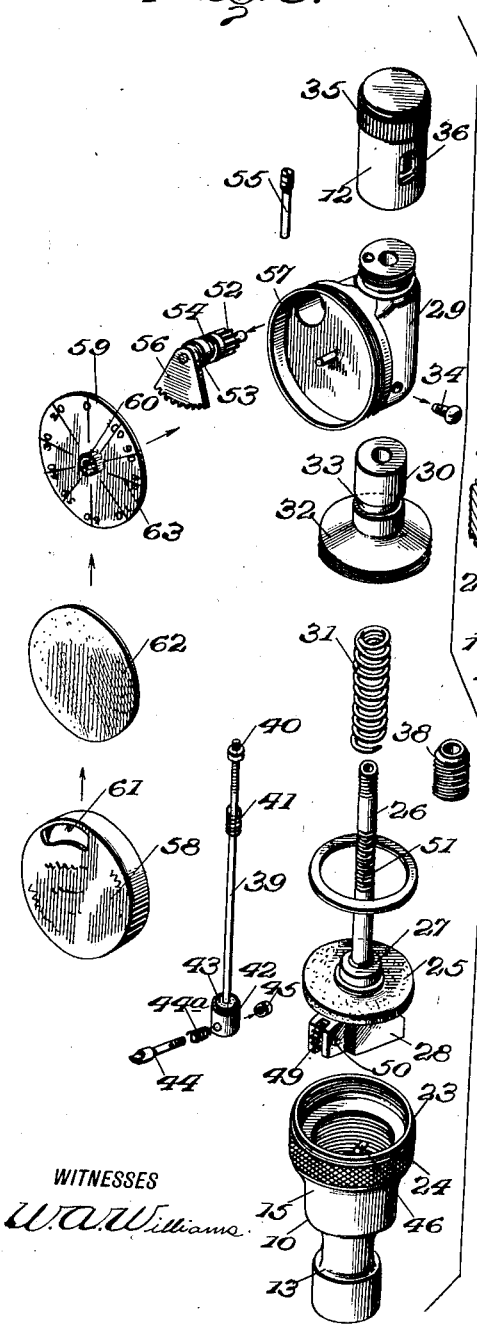
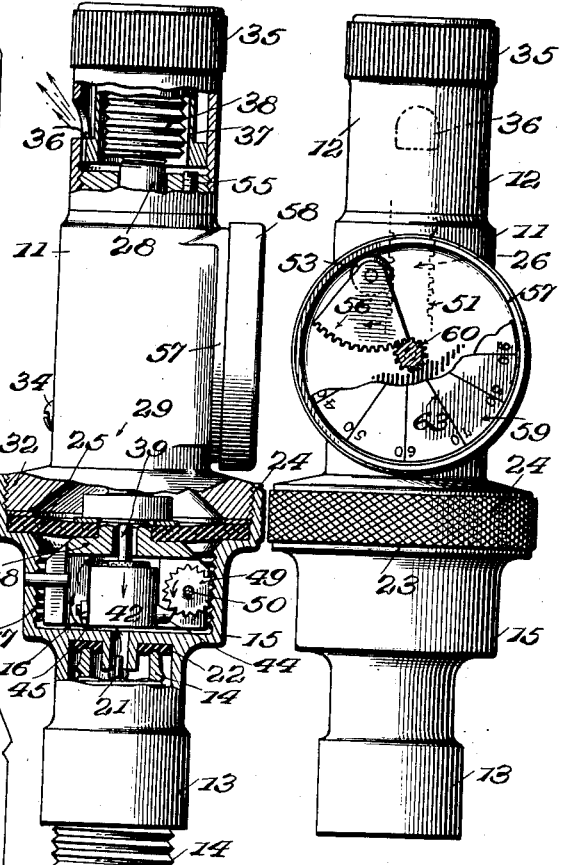
INVENTOR
W. A. Harris.

UNITED STATES PATENT OFFICE.

WILLIAM A. HARRIS, OF GREENVILLE, SOUTH CAROLINA, ASSIGNOR OF ONE-HALF TO KENNETH S. CONRAD, OF GREENVILLE, SOUTH CAROLINA.

TIRE ALARM AND GAUGE.

1,411,917.             Specification of Letters Patent.      Patented Apr. 4, 1922.

Application filed June 9, 1921. Serial No. 476,341.

*To all whom it may concern:*

Be it known that I, WILLIAM A. HARRIS, a citizen of the United States, and a resident of Greenville, in the county of Greenville and State of South Carolina, have invented certain new and useful Improvements in Tire Alarms and Gauges, of which the following is a specification.

My present invention relates generally to a combined tire alarm and gauge, my primary object being the provision of a device for attachment to the valve stem of a tire having means to sound an alarm when the pressure drops a predetermined number of pounds and to repeat the alarm each time the pressure falls a predetermined number of pounds, as well as an arrangement having a visible gauge whereby the operator can at a glance determine pressure remaining in the tire.

A still further object is the provision of a device of the above character in which provision is made for inflation of the tire without removing the device and in which provision is also made for the proper exposure of the dial of the gauge when the device is screwed on a valve stem.

A still further object is the provision of an arrangement in which the working parts are effectively housed and protected against the elements and against the entrance of dust, dirt and other foreign matter.

A still further object is the provision of parts which are simple in construction, capable of ready manufacture in quantities and effectively and efficiently cooperate in use.

In carrying out the invention it is a still further object to provide an arrangement which is applicable to tires carrying various pressures, without requiring adjustment, and in carrying out this object the invention proposes an arrangement which when placed in effective connection with a valve stem, will indicate the pressure in the tire and will sound an alarm upon each drop in pressure of a predetermined number of pounds so that the operator will be warned from time to time to examine the gauge and replenish the air supply. Low pressure alarms have been heretofore proposed by myself and by others, but are for the most part open to the objection of waste of air pressure and to the further objection that no warning is given the operator in case he should be away from his car when the alarm sounds. It is for this reason that I have provided for repetition of the alarm as well as a gauge from the latter of which the operator can instantly determine whether the alarm is first, second or third which has been sounded.

In the accompanying drawings which illustrate my invention and form a part of this specification, Figure 1 is a perspective view illustrating the practical application of my invention, Figure 2 is a central vertical section through my invention in effective position and showing normal condition, Figures 3 and 4 are horizontal sections taken respectively on lines 3—3 and 4—4 of Figure 2, Figure 5 is a detail perspective view of the various parts in detached relation, Figure 6 is a side view partly broken away and in section showing the parts in position during sounding of an alarm, and Figure 7 is a front view also partly broken away and in section.

Referring now to these figures I provide a combined pressure alarm and gauge generally comprising an attaching base 10, cylindrical body 11 and cap 12, the former of which has an internally threaded lower cylindrical portion 13 adapted to screw upon a tire valve stem 14 as particularly shown in Figures 2 and 6.

At the upper end of its lower internally threaded portion 13, the attaching base 10 has an enlarged intermediate section 15 forming a chamber 16 therein and having threads 17 upon its inner surface for a purpose to be presently described. A transverse web 18 forms the base of chamber 16 and has a central opening 19 extending through a depending boss 20 the latter of which in the effective position bears upon the valve pin 21 of the stem 14 so as to depress the latter and hold the valve open. A soft metal, preferably lead washer 22 is utilized around the boss 20 and against the lower surface of the transverse web or wall 18 to abut the upper end of the valve stem 14 and form an air tight joint.

At the upper end of its intermediate portion 15, the attaching base 10 has an enlarged annular flange coaxial therewith as indicated at 23 and preferably provided with an external knurled surface 24 facilitating the screwing of the attaching base 10 on a tire valve stem 14. This flange 23 forms between the same and the intermediate portion 15 an upwardly facing annular shoulder to receive the outer or peripheral portion of a flexible diaphragm 25, the latter rigidly clamped at its central portion around the lower threaded portion of an air tube 26, the threads of which receive a clamping nut 27 bearing against the upper surface of diaphragm 25 so as to effectively secure the same between this clamping nut and the lower enlarged head 28 of the air tube which is movable in the chamber 16 of the attaching base 10.

The body 11 is in two lengthwise telescoping sections 29 and 30, the former of which has an upper axial bore through which the upper portion of the air tube 26 is freely rotatable and longitudinally shiftable and has a lower counterbore into which the upper section of the lower portion 30 movably extends, the latter housing a spring 31 bearing thereagainst at its upper end. This spring 31 is coiled around the air tube 26 and bears at its lower end against the clamping nut 27 and thus acts to shift the air tube 26 downwardly or inwardly against the air pressure of the tire upon the lower surface of the diaphragm 25.

At its lower end, the lower portion 30 of the body 11 has an annularly enlarged portion 32 which is externally threaded and screws into the flange 23 of the attaching base 10 so as to securely clamp the peripheral portion of the diaphragm 25 between the same and the annular shoulder at the base of the flange 23 as before described, and within the lower end of the upper portion 29 of the body, the lower portion 30 has an annular groove 33 receiving the inner reduced end of a set screw 34 threaded through the wall of the upper portion 29 adjacent to its lower end so that by slightly loosening the set screw 34 the upper portion 29 may be freely rotated with respect to the lower portion 30 for a purpose which will be presently described, it being obvious that the set screw prevents lengthwise displacement of the two portions at all times and may be used to secure the upper portion 29 in desired position of rotative adjustment with respect to the lower portion.

The cap 12 threads at its lower end upon the upper end of the upper portion 29 of the body and preferably has a knurled upper ring 35 and a whistle slot 36, the latter communicating with the lower end of an inner cylinder 37 of the cap into which the upper externally threaded end of air tube 26 projects. This threaded upper end of the air tube 26 receives the lower end of a sleeve 38 having a diameter and external threads adapting it to the reception of the threaded attaching member of an inflating pump or line and having in other words a diameter and threads similar to that of the upper reduced end of a tire valve stem 14.

Through the air tube 26 extends a valve stem 39 having an upper head 40 within the sleeve 38 and a controlling spring 41 coiled therearound and compressed between the head 40 and the upper end of the air tube 26. At the lower end of this valve stem 39 is a valve head 42 movable in the cylindrical axial bore of the lower head 28 of the air tube 26 and supporting a valve disk 43 which is normally seated against the lower surface of the head 28 around the lower end of the bore of tube 26 by virtue of the action of the valve stem controlling spring 41. Extending and movable diametrically through this valve head 42 is a spring controlled plunger 44, one exteriorly projecting end of which is in the form of a ratchet head and the other exteriorly projecting end of which has a threaded adjusting nut 45 by means of which the extent of projection of its ratchet head beyond one side of the valve head may be controlled for a purpose which will presently be plain.

The lower head 28 of the air tube and consequently the air tube itself are prevented from rotation with respect to the attaching base 10 by virtue of a pin 46 which projects inwardly and radially within the chamber 16 from the wall of the intermediate section 15 of said base piece, which pin projects into a lengthwise slot 47 at one side of the head 28 so that the latter and the air tube 26 may at the same time freely shift in an axial direction. Diametrically opposed to slot 47, the head 28 has a second slot 48 into which the ratchet head of the plunger 44 extends, and in this slot 48 a toothed wheel 49 is disposed and mounted for rotation upon a transverse pin 50, with its outer portion engaged with the threads 17 internally of intermediate section 15 of the base piece 10 and with its lower inner portion engaged in turn by the ratchet head of the plunger 44.

Intermediate its ends and within the upper portion 29 of the body 11, the air tube 26 has a lengthwise series of spaced annular grooves forming a series of annular ribs 51 for engagement between the teeth 52 around the inner portion of a shaft 53 so that lengthwise movement of the air tube 26 will bring about rotation of the shaft 53 and the upper portion 29 of the body 11 can at the same time freely rotate around the air tube. The shaft 53 is mounted in a bore extending partly through the upper portion 29 of the body 11 at a tangent to its axial bore, and shaft 53 is held against endwise displacement by virtue of an annular groove 54 thereof intermediate its ends and a pin 55 which projects downwardly in the upper portion 29 of the body from its upper end parallel to the axis thereof.

At the outer end of the shaft 53 is a segmental gear 56 within a circular rim 57 at one enlarged side of the upper portion 29 of the body said rim forming with its cover or cap 58 a dial holding chamber within which is a circular rotating dial 59 having at one side an axial gear 60 engaged by the segmental gear 56 whereby swinging movement of the latter upon rotation of shaft 53, causes rotation of the dial 59.

The cover 58 of the dial casing has a segmental sight opening 61 as clearly seen in Figures 1 and 5 and as best shown in Figures 3 and 5, a celluloid or other transparent disk 62 is disposed against the inner surface of the cover between the same and the dial 59 to protect the outer surface of the latter with its annular series of graduations 63 the latter of which may be viewed through the sight opening 61.

Thus in operation with the combined device of my invention in place on a tire valve stem 14 and with pressure in the tire the parts assume the position of Figure 2 and to supply more air pressure within the tire it is simply necessary to unscrew and remove the whistle carrying cap 12. The attaching member of an air pump or air line is then screwed onto the sleeve 38 and air passes into the tire through the air tube 26 around the valve stem 39, the pressure unseating valve disk 43 against the tension of spring 41. As the air pressure increases within the tire and thus against the lower or inner face of the diaphragm 25 the latter is gradually flexed outwardly and the air tube 26 with the parts carried thereby is shifted axially in an outward direction against the tension of its controlling spring 31. As the air tube 26 moves outwardly with its lower inner head 28, the toothed wheel 49 supported in this head will be rotated in a counter-clockwise direction viewing the parts as in Figure 2 and it is quite obvious that during this rotation of the toothed wheel 49 the plunger 44 will simply yield lengthwise against the tension of its spring to the teeth of the wheel without affecting the operation of other parts. At the same time outward movement of the air tube 26 will bring about rotation of the shaft 53 of the gauge which will cause rotation of the dial 59 in a clockwise direction to register the accumulating pressure. The proper pressure having been reached, the air pump or air line is unscrewed and detached and the whistle cap again screwed in place as in Figures 2 and 6, set screw 34 having been previously slightly released so as to permit of rotation of the upper portion 29 of the body 11 in order to properly position the dial casing facing the outer side of the wheel of which a portion appears at 64 in Figure 1. The set screw 34 is then again tightened to hold the parts in this position.

As pressure decreases in the tire and is thus gradually relieved against the inner face of the diaphragm 25, the air tube controlling spring 31 in exercising its function causes gradual inward movement of this air tube and during this movement it is obvious that the toothed wheel 49 within air tube head 28 will be rotated in a clockwise direction viewing the parts as in Figure 2 so that on account of its location above the plunger 44 the latter cannot yield with respect to the valve stem head 42 but this head and the valve stem will be shifted lengthwise with respect to the air tube 26 and against the tension of the valve stem controlling spring 41 whereby the valve disk 43 will be shifted away from its seat and the interior of the air tube 26 placed in communication with the pressure chamber 16 of the attaching base as shown in Figure 6. Pressure will thereupon escape outwardly through the air tube and through the whistle slot 36 of the cap 12 so as to sound the alarm. This takes place as each tooth of the wheel 49 rides over the ratchet head of plunger 44 and as each tooth passes the plunger it is obvious the valve disk 43 is immediately reseated when the valve head 42 can shift outwardly under tension of its spring 41. Thus it is obvious that by adjustment of the nut 45 to control the outstanding projection of the ratchet head of plunger 44, the time that the valve disk 43 is unseated can be controlled and in this way regulate the length of time of the sounding of each alarm.

It is obvious that during loss of pressure within the tire the air tube 26 will continue to move axially and inwardly, dial 59 will continue to rotate in a counter-clockwise direction and the toothed wheel 49 will continue to rotate, unseating valve disk 43 each time one of its teeth rides over the ratchet head of the plunger 44 and it is obvious upon each of these latter movements an alarm will be sounded, thus bringing about a repetition at regular intervals of the pressure leak alarm, and these intervals including the interval before the first alarm is sounded, may be controlled by varying the threads 17 within the attaching base and the teeth of the wheel 49 engaging the threads.

I claim:—

1. In a device of the character described, a lengthwise shiftable air tube having an enlarged head at one end and an externally threaded sleeve at its opposite end, a diaphragm centrally through which said tube is clamped adjacent to its headed end, a support in which the tube moves including parts clamping the outer edge of the diaphragm, a spring engaging the tube to shift the same in one direction, a valve case within the head seated around one end of the tube and normally closing the same, a laterally movable plunger carried by the valve member, and means supported by the head of said tube in engagement with the said plunger, and movable connection with a portion of the support for unseating the valve and with respect to which the plunger is yieldable upon movement of the tube in one direction.

2. A device of the character described, comprising a support attachable to the valve stem of a pneumatic tire having a diaphragm therein and a threaded portion at one side of the diaphragm, an axially movable air tube having one headed end clamped through the diaphragm, an audible alarm member in which the opposite end of the tube opens, a valve within the head of the tube normally closing the tube, and a toothed wheel rotatable in the head and engaging the said threads of the support, said toothed wheel also engaging a portion of the valve and acting to periodically unseat the valve, as described.

3. A device of the character described, including a pressure actuated spring controlled air tube, an air actuated alarm member in which the outer end of the tube opens, a valve normally closing the inner end of the tube, a support for the tube, and relatively engaging means carried by the tube and the said support for unseating the said valve at spaced points in the movement of the tube.

4. A device of the character described including a pressure actuted spring controlled axially movable air tube, an air actuated alarm member with which one end of the tube communicates, a valve normally closing the opposite end of the tube, a member carried by the said tube and rotatable with respect thereto during movement of the tube, having peripheral teeth, and a member carried by the valve and engaged by the said teeth whereby to unseat the valve at intervals during rotation of the first named member.

5. A device of the character described including a pressure actuated spring controlled axially movable air tube, an air actuated alarm member with which one end of the tube communicates, a valve normally closing the opposite end of the tube, a member carried by the said tube and rotatable with respect thereto during movement of the tube, having peripheral teeth, and a member carried by the valve and engaged by the said teeth whereby to unseat the valve at intervals during rotation of the first named member, said last named member being shiftable independent of the valve upon rotation of the first named member in one direction.

6. A device of the character described, comprising a base section having a threaded portion to screw upon the valve stem of a pneumatic tire, a body threaded in connection with the base section, a diaphragm clamped between the body of the base section, a tube movable lengthwise through the body and clamped adjacent to one end through the diaphragm, a cap on the body into which the opposite end of the tube opens having a whistle aperture, a valve normally closing the opposite end of the tube within the base section, a spring engaging the tube to shift the same toward the base section, and means carried by the tube and coacting with the base section to unseat the valve at intervals during movement of the tube under actuation of its spring.

7. A tire alarm comprising an axially movable spring controlled and pressure actuated air tube, a valve normally closing said tube, an alarm member actuated by air pressure through the tube, and means for periodically unseating the valve during continuous movement of the tube in one direction under tension of its spring.

WILLIAM A. HARRIS.